United States Patent
Galbraith et al.

[11] 3,712,332
[45] Jan. 23, 1973

[54] PRESSURE REGULATING VALVE

[75] Inventors: Lyle D. Galbraith, Redmond; Alan R. Harvey, Bellevue, both of Wash.

[73] Assignee: Rocket Research Corporation, Redmond, Wash.

[22] Filed: Feb. 26, 1971

[21] Appl. No.: 119,145

[52] U.S. Cl. .........137/495, 137/505.18, 137/505.46
[51] Int. Cl. ...............................................F16k 31/14
[58] Field of Search............137/495, 505.18, 505.46; 251/75, 74, 66, 280, 291, 294

[56] References Cited

UNITED STATES PATENTS

| | | | |
|---|---|---|---|
| 3,400,735 | 9/1968 | Favors et al. | 137/495 X |
| 1,824,072 | 9/1931 | Bullard | 137/495 X |
| 2,096,785 | 10/1937 | Carter | 137/495 X |
| 2,822,693 | 2/1958 | Mulsow | 251/280 X |
| 2,825,358 | 3/1958 | Niles | 137/505.18 |
| 3,330,295 | 7/1967 | Peterson | 137/505.46 X |

*Primary Examiner*—Henry T. Klinksiek
*Attorney*—Graybeal, Uhlir & Hughes

[57] ABSTRACT

A pressure regulating valve adapted to receive high pressure fluid from, for example, a bottle of compressed gas and to direct this gas at a substantially constant pressure to accomplish, for example, a function such as pressurizing or inflating a life raft, bag or other device. The valve comprises a housing defining a front regulating chamber, a middle high pressure chamber and a rear spring retaining chamber. Within the housing is a valve element comprising front and rear piston members joined by a rod. In the closed position of the valve the front and rear piston members close, respectively, the front and rear ends of the high pressure chamber, with a compression spring in the spring retaining chamber urging the valve element to a forward position. The valve element is retained in its closed position by an over-center toggle mechanism mounted in the housing adjacent the high pressure chamber, with the forward end of the toggle mechanism bearing against the housing, and the rear portion of the toggle mechanism bearing against the valve element. When the toggle mechanism is pulled out of its toggle position, the spring moves the valve element forwardly to open the front end of the pressure chamber to the regulating chamber. The pressure in the regulating chamber acts on the forward end of the valve element to balance the force of the compression spring and thus control the pressure in the regulating chamber. A high pressure inlet opening communicates laterally into the high pressure chamber, and a regulated pressure outlet opening extends laterally from the regulating chamber.

11 Claims, 4 Drawing Figures

PATENTED JAN 23 1973  3,712,332
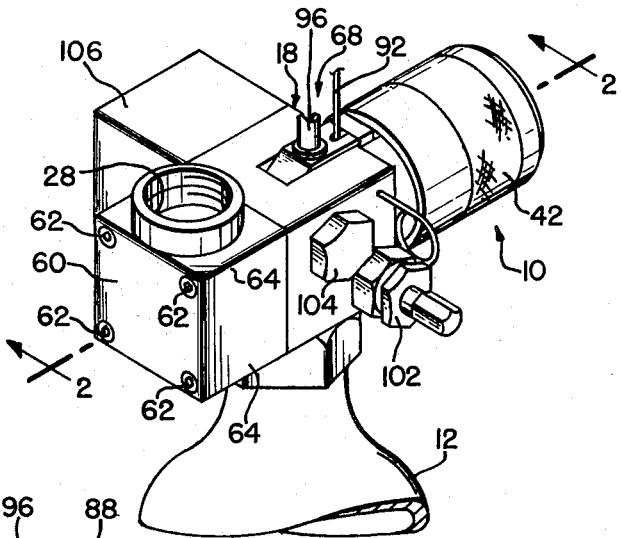
FIG. 1
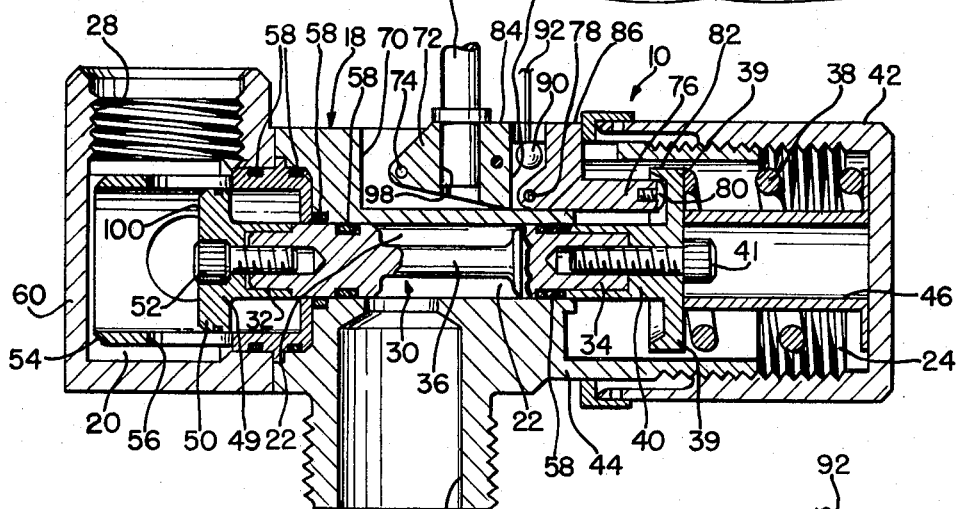
FIG. 2
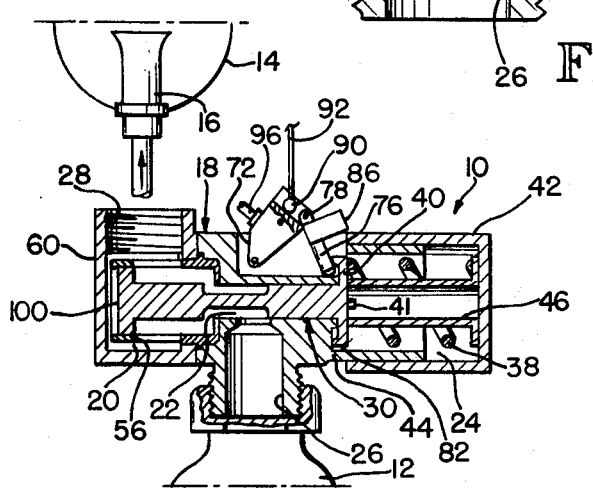
FIG. 3
FIG. 4
INVENTORS
LYLE D. GALBRAITH
ALAN R. HARVEY
BY
Graybeal, Cole & Barnard
ATTORNEYS

PRESSURE REGULATING VALVE

BACKGROUND OF THE INVENTION

1. Field of the Invention

The present invention relates to a pressure regulating valve, particularly a valve adapted to receive gas from a high pressure source, such as a bottle of compressed gas, and to deliver this high pressure gas at a substantially constant lower pressure to accomplish, for example, inflation and/or pressurizing of a device such as a life raft, bag, inflatable escape slide, etc.

2. Description of the Prior Art

There are in the prior art various devices which balance a spring force against a force generated from a downstream back pressure to regulate the flow of fluid so as to provide a substantially constant downstream fluid pressure. When such a regulating valve is also used as a closure valve, there is the problem of providing adequate means to move the valve to its open regulating position and back to its closed position. Some prior art devices use a threaded member to obtain a mechanical advantage to move a valve element back to its proper position against the force of the regulating spring. Such devices, however, quite often do not readily lend themselves to quick and easy movement of the valve to its regulating position or back to its closed position.

Thus, it is an object of the present invention to provide a pressure regulating valve having a closed position and a regulating position and which is so arranged that it can easily be moved to its regulating position and back to its closed position, while retaining in the valve a proper balance of simplicity and reliability of design.

SUMMARY OF THE INVENTION

The present invention comprises a valve housing having chamber means comprising a front regulating chamber, a center high pressure chamber and a rear spring retaining chamber, with a high pressure inlet leading to the high pressure chamber, and an outlet leading from the regulating chamber. Within the housing is a valve element comprising front and rear piston members joined by a connecting rod thus having the configuration of a spool valve. In a closed position of the valve, the front and rear valve piston members close the high pressure chamber, with a compression spring in the spring retaining chamber urging the valve element forwardly to an open regulating position. The forward housing section with its laterally extending outlet can be moved to different lateral positions, the rear housing portion threadedly engages a center housing portion so that by rotating the rear housing section the force of the spring can be adjusted.

The valve element is retained in its closed position by a toggle mechanism positioned in a recess adjacent the high pressure chamber and spaced laterally therefrom. In its toggle or locked position this mechanism bears against the housing and the valve element so as to exert a rearward force on the latter to resist the compression spring. To place the valve in its open regulating position, the pivot point of the toggle mechanism is moved by a pull release cord through an over-center position to an out-of-toggle position, whereby the spring pushes the valve element to a forward regulating position, in which the high pressure chamber communicates with the regulating chamber. As pressure builds up in the regulating chamber, a back pressure is exerted on the front face of the forward valve piston member to urge the valve element toward its closed position. At a predetermined pressure in the regulating chamber, the force of the back pressure balances the force of the spring so that there is a substantially constant downstream pressure. When it is desired to move the valve element back to its closed position against the action of the compression spring, a lever is used to push the toggle mechanism back into its over-center toggle position. The toggle mechanism is provided with a pair of jaws which in their closed position retain a ball at the end of a pull-release cord, with the cord extending from the toggle mechanism. Thus, the release cord with the ball element is positioned to again release the valve to its open regulating condition.

DESCRIPTION OF THE DRAWING

FIG. 1 is an isometric view of the regulating valve of the present invention;

FIG. 2 is a longitudinal sectional view taken along line 2 — 2 thereof, with the valve in its closed position;

FIG. 3 is a view similar to FIG. 2 but showing the valve in its open regulating position and FIG. 4 is an isometric view of the locking and release toggle mechanism of the present invention.

DESCRIPTION OF THE PREFERRED EMBODIMENT

The regulating valve 10 of the present invention functions to receive a high pressure fluid from a source, such as a bottle 12 of compressed gas and discharge this fluid at a substantially constant pressure. This constant pressure gas flow can be used, for example, to inflate a device 14 such as a life raft or bag, by directing the gas into an inflating mechanism, such as the one indicated schematically at 16.

The regulating valve 10 comprises a housing 18 which defines a forward regulating chamber 20, a middle high pressure chamber 22, and a rear spring retaining chamber 24. The housing 18 also has a high pressure inlet opening 26 extending laterally inwardly to the high pressure chamber 22, and the housing 18 also has an outlet opening 28 extending laterally from the forward regulating chamber 20.

Mounted within the housing 18 is a movable valve element 30 comprising a forward piston 32, a rear piston member 34 and a rod 36 connecting the two piston members 32 and 34. A compression spring 38 is mounted in the aforementioned spring retaining chamber 24 and bears against a radial flange portion 39 of a circular end member 40 at the back end of the rear piston member 34 so as to urge the valve element 30 forwardly. The member 40 is connected to the valve element 30 by means of a bolt 41. The spring retaining structure of the housing 18 is made as a cylindrical casing 42 which is threaded onto a central portion 44 of the housing 18. Thus, by threading the casing 42 further into or out of threaded engagement with the housing portion 44, the force of the spring 38 on the valve element 30 can be regulated. Within the spring chamber 24 there is an axially aligned stop member 46 to limit the rearward travel of the valve element 30.

At the forward end of the forward piston member 32 of the valve element 30 there is a forward end member 49 having a radial flange 50 and connected by bolt 52 to the valve element 30. This flange 50 is slide mounted in a sleeve insert 54 for longitudinal axial slide motion therein. The sleeve insert 54 has lateral openings 56 so that there may be proper communication between the chamber 20 and the outlet opening 28. To insure proper sealing of the high pressure chamber 22 with the valve 10 in its closed position, 0 rings are provided at locations indicated at 58.

The forward housing section 60 has a generally square prismatic configuration and is connected to the central housing section by four longitudinal bolts 62 arranged in a square pattern and extending through longitudinal edge portions 64 of the housing section 60 to the housing portion 44. With this arrangement the housing section 60 is adjustably mounted so that by unbolting the section 60, it can be rotated 90°, thus directing the outlet 28 to a direction 90° from the upward direction illustrated in the accompanying drawing.

The closure and release mechanism is generally designated 68 and is positioned in a recess 70 formed in the top middle portion of the housing 18 adjacent the high pressure chamber 22. This mechanism 68 is formed as a toggle linkage comprising a forward arm or link 72, the forward end of which is pivotally mounted by a transverse horizontal pin 74 to the housing 18.

The rear link or arm 76 of the mechanism 68 is pivotally connected at its forward end to the rear end of the link 72 by means of a horizontal transverse pin 78. The rear end of the pin 78 has a replaceable bearing head 80 threaded thereon which engages the forward surface of the flange 40 of the valve rear member 34, the flange 40 having a forwardly extending peripheral lip 82 to enhance proper engagement of the head 80.

Both of the toggle links 72 and 76 have at the location of the pivot pin 78 respective upstanding jaw portions 84 and 86, each of which is at substantially right angles to its respective link 72 or 76. The two jaws 84 and 86 are arranged to close one to the other when the toggle mechanism 68 is in its locked or toggle position, as shown in FIG. 2. The jaw member 84 is formed with an interior recess 88 to receive a ball element 90 attached to a release cord 92 which reaches through a slot 94 formed in the upper portion of the jaw 84. The two jaw elements 84 and 86 are so arranged that the ball 90 is directly above or laterally of the pivot pin 78, and a force vector drawn through the pivot pin 78 and the ball element 90 would be at substantially right angles to the force line between the front bearing point 74 of the link 72 and the rear bearing point 80 of the link 76 with the links 72 and 76 in their toggle position. Also, it can be seen that the pivot axis 78 is slightly below or over-center from the line drawn between the points 74 and 80. Thus, by exerting an upward pull pressure on the release cord 92, the ball element 90 pulls at right angles to the toggle linkage 72 – 76 and moves the pivot pin 78 from an over-center position through a center position to a release position as shown in FIG. 3.

To restore the valve 10 to its closed position an elongate tool 96 is inserted into a mating hole 98 in the forward link 72, and this tool 96 acting as a lever arm is moved clockwise as seen in FIGS. 2 and 4 to extend the toggle mechanism 72 – 76 to its extended or toggle position, as seen in FIG. 2. Prior to so extending the toggle linkage 72 – 76, the ball element 90 is placed in the recess 88, with the release cord 92 extending through the slot 94, as shown in FIG. 4. Thus, the cord 92 is again in position to be pulled and cause the valve 90 to move to its release position.

To describe the operation of the valve 10, let it first be assumed that the valve 10 is in its closed position, as shown in FIG. 2. In this position the forward and rear valve piston members 32 and 34 close, respectively, the front and rear ends of the high pressure chamber 22 which communicates with the high pressure compressed gas source 12 through the high pressure inlet 26. When it is desired to inflate the device 14, the cord 92 is pulled to move the toggle mechanism 68 through its over-center position to the release position shown in FIG. 3. Immediately the compression spring 38 moves the valve element 30 forwardly (to the left as shown in FIG. 3) so that there is a passageway formed from the high pressure inlet 26 into the chamber 22, thence by the forward piston member 32 into the regulating chamber 20, and from the regulating chamber 20 into the outlet opening 28.

As pressure builds up in the regulating chamber 20 this pressure exerts a rearward force on the front face 100 of the member 49 of the forward piston 32. When the pressure in the chamber 20 becomes greater than a predetermined value (for example, 200 psi), the force on the face 100 is sufficient to overcome the force of the spring 38 to cause the valve element to move rearwardly. This in turn restricts the flow from the high pressure chamber 22 to the regulating chamber 20, which in turn reduces the pressure in the regulating chamber 20. Thus, it can be seen that a balance is achieved between the pressure in the regulating chamber 20 and the force of the spring 38, with the result that there is gas at a substantially constant pressure flowing from the regulating chamber 20 to the valve outlet 28.

When the high pressure gas in the bottle 12 has been exhausted, there is no restoring force form the pressure in the regulating chamber 20, and the full force of the spring 38 holds the valve element 30 in its furthest forward or open position. To overcome the substantial force of the spring 38, the tool 96 is, as described above, inserted in the hole 98 in the mechanism 68 and rotated to move the toggle linkage 68 toward its toggle position shown in FIG. 2. As the links 72 and 76 move into toggle position, they pass through to over-center position, so that they are held with moderate force in locked or toggle position.

To refill the bottle 12, a refill valve 102 is provided on the side of the housing 18, and this valve 102 communicates with the high pressure chamber 22, which in turn communicates with the bottle 12 through the inlet opening 26. A pressure relief device 104 is also mounted to the side of the housing 18 and is in communication with the high pressure chamber 22. A pressure gage can be mounted in a lateral extension of the housing, such as that shown at 106.

What is claimed is:

1. A regulating valve for receiving fluid at a higher pressure and delivering said fluid at a lower pressure, said valve comprising:
   a. a valve housing having a longitudinal axis and comprising:
      1. a front regulating chamber, 2. a middle high pressure chamber,
   3. a rear spring retaining structure,
   4. a high pressure inlet leading to the high pressure chamber,
   5. an outlet leading from the regulating chamber;
  b. a valve element mounted in said housing and comprising:
   1. a front piston member,
   2. a rear piston member,
   3. a connecting rod reaching between and connecting to said first and second piston members,
  c. said valve element having a rear closed position wherein the rear piston closes the rear end of the high pressure chamber and the front piston closes the forward end of the high pressure chamber, and being movable to a forward open pressure regulating position wherein the front piston is positioned to open the front end of the high pressure chamber whereby a flow passage is opened from the inlet through the high pressure chamber into the regulating chamber and through the outlet, with a front back pressure surface of said forward piston acting in response to pressure in said regulating chamber to urge the valve element rearwardly,
  d. spring member mounted in the spring retaining structure and arranged to urge said valve element to its forward position,
  e. a valve closing and release mechanism comprising a toggle mechanism having a forward and rear link, said links being pivotally connected to one another at a middle pivot point, the forward link having a rear contact portion bearing against the housing, and the rear link having a rear contact portion to bear against the valve element, the links being movable to a toggle in-line position in which the valve element is held in its rear closed position, and further being movable to an out-of-toggle position, wherein said valve element can be moved by the spring member to its forward regulating position, and
  f. said toggle links having two jaws arranged to move together when said toggle mechanism moves to its toggle position, at least one of said jaws having an interior recess adapted to contain a release member retained in said recess and reaching outwardly therefrom, whereby when said release member is pulled to move said toggle mechanism to its out-of-toggle position, said jaws open to permit said release member to move free of engagement with the toggle mechanism.

2. The apparatus as recited in claim 1, wherein said housing has three sections,
  a. a middle section defining said high pressure chamber,
  b. a rear section comprising said spring retaining structure, and arranged to threadedly engage the middle section, whereby said rear section's position can be adjusted in a longitudinal direction by rotating said rear section so as to control the force of the spring member,
  c. a front section adjustably connected to the middle section so as to be able to be moved to multiple positions about the longitudinal axis of the housing,
  d. said outlet extending laterally from the front section so that as said front section is moved to a different position said outlet is directed in a correspondingly different laterally extending position.

3. The apparatus as recited in claim 2, wherein said inlet extends laterally into said high pressure chamber, and the housing has a recess proximate said high pressure chamber, said toggle mechanism in its toggle position being located within said recess.

4. The apparatus as recited in claim 3, wherein said toggle mechanism is arranged to move to its out-of-toggle position by moving away from said housing, said toggle being movable to its toggle position through an over-center position, wherein said toggle is urged by pressure from said spring to remain in its toggle position.

5. The apparatus as recited in claim 4, wherein said toggle links have two jaws arranged to move together when said toggle mechanism moves to its toggle position, at least one of said jaws having an interior recess adapted to contain a release member retained in said recess and reaching outwardly therefrom, whereby when said release member is pulled to move said toggle mechanism to its out-of-toggle position, said jaws open to permit said release member to move free of engagement with the toggle mechanism.

6. The apparatus as recited in claim 4, wherein one of the links has means to engage a lever member, whereby said lever member may be used to obtain a mechanical advantage to move said toggle mechanism to its toggle position against the urging of the spring.

7. The apparatus as recited in claim 6, wherein said toggle links have two jaws arranged to move together when said toggle mechanism moves to its toggle position, at least one of said jaws having an interior cavity, a release member retained in said cavity and reaching outwardly therefrom, whereby when said release member is pulled to move said toggle mechanism to its out-of-toggle position, said jaws open to permit said release member to move free of engagement with the toggle mechanism.

8. The apparatus as recited in claim 7, wherein said release member comprises a ball member positioned in said cavity and a pull cord extending from said toggle mechanism.

9. The apparatus as recited in claim 4, wherein said front link is pivotally mounted by its front end to the housing and the rear link has a thrust bearing head engaging an outward flange of the rear cylinder member.

10. A regulating valve for receiving fluid at a higher pressure and delivering said fluid at a lower pressure, said valve comprising:
  a. a valve housing having a longitudinal axis and comprising:
   1. a front regulating chamber,
   2. a middle high pressure chamber,
   3. a rear spring retaining structure,
   4. a high pressure inlet leading to the high pressure chamber,
   5. an outlet leading from the regulating chamber;
  b. a valve element mounted in said housing and comprising:
   1. a front piston member,
   2. a rear piston member,
   3. a connecting rod reaching between and connecting to said first and second piston members, c. said valve element having a rear closed position wherein the rear piston closes the rear end of the high pressure chamber and the front piston closes the forward end of the high pressure chamber, and being movable to a forward open pressure regulating position wherein the front piston is positioned to open the front end of the high pressure chamber whereby a flow passage is opened from the inlet through the high pressure chamber into the regulating chamber and through the outlet, with a front back pressure surface of said forward piston acting in response to pressure in said regulating chamber to urge the valve element rearwardly, d. spring member mounted in the spring retaining structure and arranged to urge said valve element to its forward position, e. a valve closing and release mechanism comprising a toggle mechanism having a forward and a rear link, said links being pivotally connected to one another at a middle pivot point, the forward link having a rear contact portion bearing against the housing, and the rear link having a rear contact portion to bear against the valve element, the links being movable to a toggle in-line position in which the valve element is held in its rear closed position, and further being movable to an out-of-toggle position, wherein said valve element can be moved by the spring member to its forward regulating position, f. one of said links having means to engage a lever member, whereby said lever member may be used to obtain a mechanical advantage to move said toggle mechanism to its toggle position against the urging of the spring, and g. said toggle links having two jaws arranged to move together when said toggle mechanism moves to its toggle position, at least one of said jaws having an interior cavity, a release member retained in said cavity and reaching outwardly therefrom, whereby when said release member is pulled to move said toggle mechanism to its out-of-toggle position, said jaws open to permit said release member to move free of engagement with the toggle mechanism.

11. The apparatus as recited in claim 10, wherein said release member comprises a ball member positioned in said cavity and a pull cord extending from said toggle mechanism.

* * * * *